Dec. 10, 1940.  E. P. DRAGGOO  2,224,474
MECHANICAL SNARE TRAP
Filed May 16, 1939

Eli P. Draggoo, INVENTOR
BY Victor J. Evans & Co.
ATTORNEYS

Patented Dec. 10, 1940

2,224,474

UNITED STATES PATENT OFFICE 2,224,474

MECHANICAL SNARE TRAP

Eli P. Draggoo, Chelan, Wash.

Application May 16, 1939, Serial No. 274,059

3 Claims. (Cl. 43—87)

This invention relates to animal traps, and its general object is to provide a trap of the snare type that includes spring motor operated mechanical means rendered active by a trip line when the latter is contacted by an animal for drawing the noose of the snare line about the animal, and the snare line is held against outward play and under constant tension to prevent any possibility of the animal becoming free therefrom.

A further object is to provide a mechanical snare trap, in which the mechanical means is enclosed for protection against dirt, like foreign matter, and the weather elements, and anchoring means is provided for the trap to allow for free swivel movement thereof.

Another object is to provide a trap of the character set forth, that is simple in construction, easy to set, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
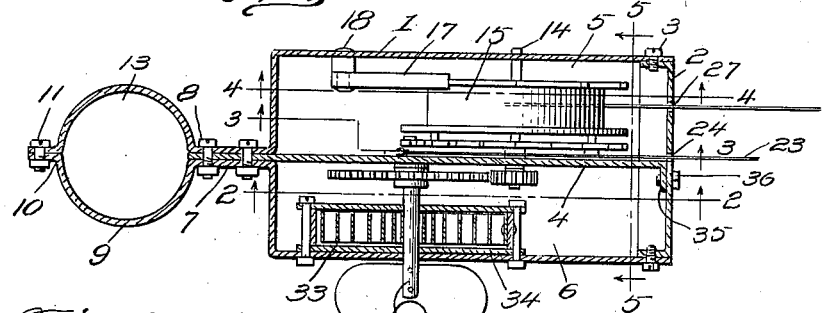
Figure 1 is a horizontal sectional view taken through the trap which forms the subject matter of the present invention.
Figure 2:
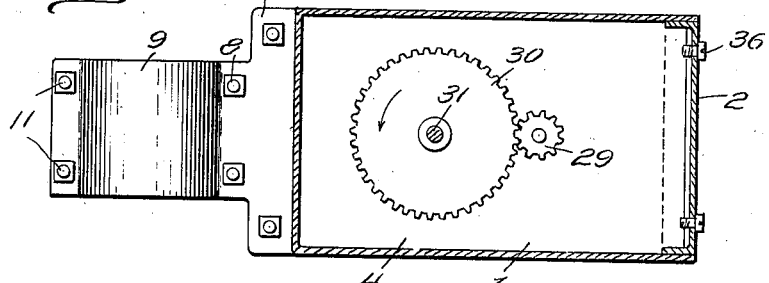
Figure 2 is a sectional view taken approximately on line 2—2 of Figure 1, looking in the direction of the arrows.
Figure 3:
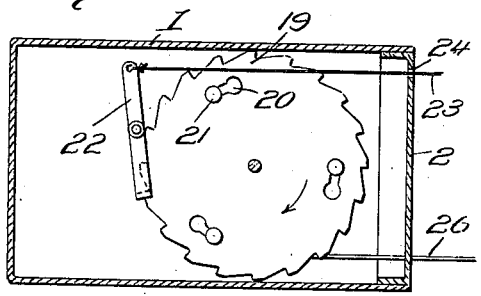
Figure 3 is a sectional view taken approximately on line 3—3 of Figure 1, looking in the direction of the arrows.

Referring to the drawing in detail, the reference numeral 1 indicates the housing which as shown is of rectangular formation and includes top, bottom, side and rear walls, while the front is closed by a cover plate 2 provided with marginal flanges inserted within the housing and secured by screw bolts 3.

Extending longitudinally within the housing is a partition 4 that divides the same into compartments 5 and 6 and the partition extends beyond the rear wall which is made up of a pair of sections having outwardly directed flanges 7 formed thereon, with the partition extending between the same, and secured accordingly by bolt and nut connections 8. The flanges 7 have formed thereon collar portions 9 including tongues 10 secured together by bolt and nut connections 11 to provide a collar as shown, mounted for swivel movement in an annular recess 12 formed in the head of an anchoring stake 13.

Figure 4:
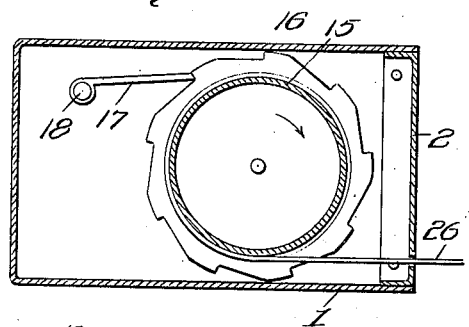
Figure 4 is a sectional view taken approximately on line 4—4 of Figure 1, looking in the direction of the arrows.
Figure 5:
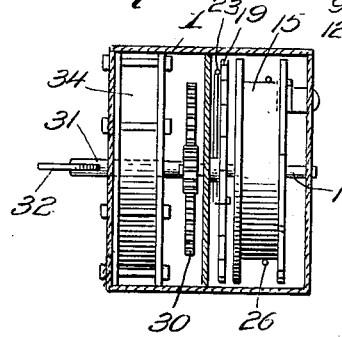
Figure 5 is a sectional view taken approximately on line 5—5 of Figure 1, looking in the direction of the arrows.

Journaled in one side wall and the partition 4 for bridging the compartment 5 is a shaft 14 having rotatably mounted thereon a reel 15 provided with ratchet teeth 16 about the periphery of one of its flanges as best shown in Figure 4 and cooperating with the ratchet teeth 16 is a gravity actuated dog 17 to prevent retrograde movement of the reel for a purpose which will be later apparent, and the dog is pivotally mounted on a pin 18 secured to and extending inwardly from the last mentioned side wall, as clearly shown in Figure 1.

Fixed to the shaft 14 is a ratchet disk 19 having its teeth disposed in a direction opposite to that of the teeth 16 and the disk 19 has key hole shaped slots 20 circumferentially arranged therein for the purpose of receiving headed pins 21 secured to and extending laterally from the other flange of the reel, and by that construction, it will be obvious that the reel is detachably associated with the ratchet disk 19. Pivotally mounted between its ends to the partition 4 is a trip lever 22 having one end bent at right angles upon itself for disposal in the path of the teeth of the ratchet disk 19 to hold the shaft 14 against rotation in one direction and the opposite end of the lever 22 has an opening therein within which is connected one end of a trip line 23 that extends through an opening 24 in the cover plate for connection with a stake or the like 25 for setting the trap, as will be apparent upon inspection of Figure 6.

Secured to the reel 15 is a snare line 26 extending through an opening 27 in the cover plate 2 and the snare line is looped upon itself in the usual manner to provide a noose 28 which when the trap is set, is laid below the trip line so that the latter will be disposed in the path of an animal endeavoring to obtain the bait within the area of the noose. The snare and trip lines are preferably made from flexible wire.

The shaft 14 extends through the partition 4 within the chamber 6 and has fixed to the extending portion thereof, a pinion 29 meshing with a gear 30 fixed to a shaft 31 that is journaled in the partition 4 and the other side wall of the casing, as best shown in Figure 1, the shaft 31 extending through the latter side wall and has secured thereto a winged plate 32 providing a key for winding up a coil spring 33 that has its inner end secured to the shaft 31 and its outer end secured to the circular wall of a casing 34 within the chamber 6 and fixed to the side wall thereof, with the result it will be seen that the casing, coil spring 33, shaft 31 and its key provide a spring motor for actuating the reel 15 for drawing the noose about the animal when the lever 22 is tripped, by the animal coming in contact with the trip line 23.

Figure 6:
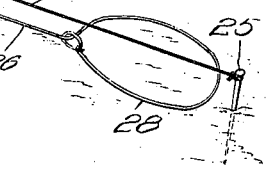
Figure 6 is a perspective view illustrating the trap in set position.

When the animal is caught, it will be obvious that the snare line 26 is held against outward play by the dog 17 and is under constant tension, thereby preventing any possibility of the animal becoming free from the noose. In setting the trap, the cover plate 2 is removed, so that access may be had to the reel 15 for detaching the same from the ratchet disk 19, so as to release the dog 17 from the teeth 16. The noose of the snare line can then be set, thence the reel is again secured to the ratchet disk 19. The motor is wound and finaly the trip line is disposed in place, as shown in Figure 6.

The partition 4 is flanged as at 35 and the cover plate is secured to the flange by screw bolts 36, so as to prevent any possibility of displacement of the partition.

While I have illustrated a trap of this character that includes a housing for enclosing the parts, the latter may be mounted within an open frame, and while the frame will not protect the parts, especially against weather elements, such as snow and ice, it will allow ready access to the reel for applying and removing the same with respect to the ratchet disk 19. The structure shown also includes a pair of shafts, with gears between the same, but the gears may be eliminated, and in that event a single shaft will be used with the spring motor and ratchet disk 19 secured thereto.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A snare trap comprising enclosing means, a spring motor within the enclosing means, a shaft mounted for rotation in the enclosing means, a reel rotatably mounted on the shaft, teeth formed on the periphery of the reel, means engaged with the teeth to prevent movement of the reel in one direction, a ratchet disk secured to the shaft, and having circumferentially arranged key hole shaped slots therein, headed pins fixed to and extending laterally from the reel to be received in the slots for detachably securing the reel to the ratchet disk, trip means for the ratchet disk, a trip line connected to the trip means, and a snare line connected to the reel.

2. A snare trap comprising a housing including a flanged end and an open opposite end, a removable closure for the open end, a collar formed on the flanges of the housing for attaching the trap in use for swivel movement, a partition secured to and between the flanges and to the closure respectively, a shaft journaled in the partition and one side of the housing, a reel rotatably mounted on the shaft, teeth formed on the periphery of the reel, means engageable with the teeth to prevent movement of the reel in one direction, a ratchet disk secured to the shaft, means for detachably securing the reel to the ratchet disk, a trip lever pivoted to said partition and engageable with the ratchet disk, a trip line connected to the trip lever, a second shaft journaled in the partition and the opposite side of the housing and geared to the first shaft, a spring secured to the second shaft for rotating the latter, and a snare line connected to the reel.

3. A snare trap comprising a housing having an open end, a closure for said end, a partition secured to the closure and the opposite end of said housing, a shaft journaled in the partition and one side of the housing, a reel rotatably mounted on the shaft, teeth formed on the periphery of the reel, a pivoted dog engageable with the teeth to prevent movement of the reel in one direction, a ratchet disk secured to the shaft and having key hole shaped slots therein, headed pins extending laterally from the reel and received in the slots for detachably securing the reel to the ratchet disk, a trip lever pivotally secured to the partition and engageable with the ratchet disk, a trip line connected to the trip lever and extending through said closure, a second shaft journaled in the partition and the other side wall of the housing and geared to the first shaft, a spring secured to the second shaft, a winged plate secured to the second shaft for rotating the latter and providing a key for winding said spring, and a snare line secured to said reel and extending through said closure.

ELI P. DRAGGOO.